United States Patent [19]

Yohe et al.

[11] Patent Number: 4,526,692
[45] Date of Patent: Jul. 2, 1985

[54] PROCESS FOR PURIFICATION OF CONTAMINATED GROUNDWATER

[76] Inventors: Thomas L. Yohe, 1406 Morstein Rd.; Karl M. Kyriss, 1554 Mill Race La., both of West Chester, Pa. 19380

[21] Appl. No.: 570,299

[22] Filed: Jan. 13, 1984

[51] Int. Cl.³ .................................................. C02F 1/74
[52] U.S. Cl. .................................... 210/747; 210/758; 210/765
[58] Field of Search ............... 210/170, 747, 758, 765, 210/901

[56] References Cited

U.S. PATENT DOCUMENTS

| | | | |
|---|---|---|---|
| 370,016 | 9/1887 | Hyatt | 210/758 |
| 2,560,978 | 7/1951 | Persson et al. | 210/758 |
| 2,872,415 | 2/1959 | Schleyer et al. | 210/758 X |
| 4,167,973 | 9/1979 | Forte et al. | |
| 4,401,569 | 8/1983 | Jhaveri et al. | 210/747 X |

Primary Examiner—Thomas Wyse
Attorney, Agent, or Firm—Howson and Howson

[57] ABSTRACT

A domestic well water system, rendered unusable by volatile contaminants in the groundwater, can be restored to use by installing an aerator in a flow path such that water is continuously pumped, by the existing well pump, out of the well, through the aerator, and back to the well through the well head. Water is diverted from this flow path for use. The well serves as a storage device, and water returned from the aerator to the well mixes with water in the well and serves as a buffer to encroachment by contaminated groundwater.

11 Claims, 2 Drawing Figures

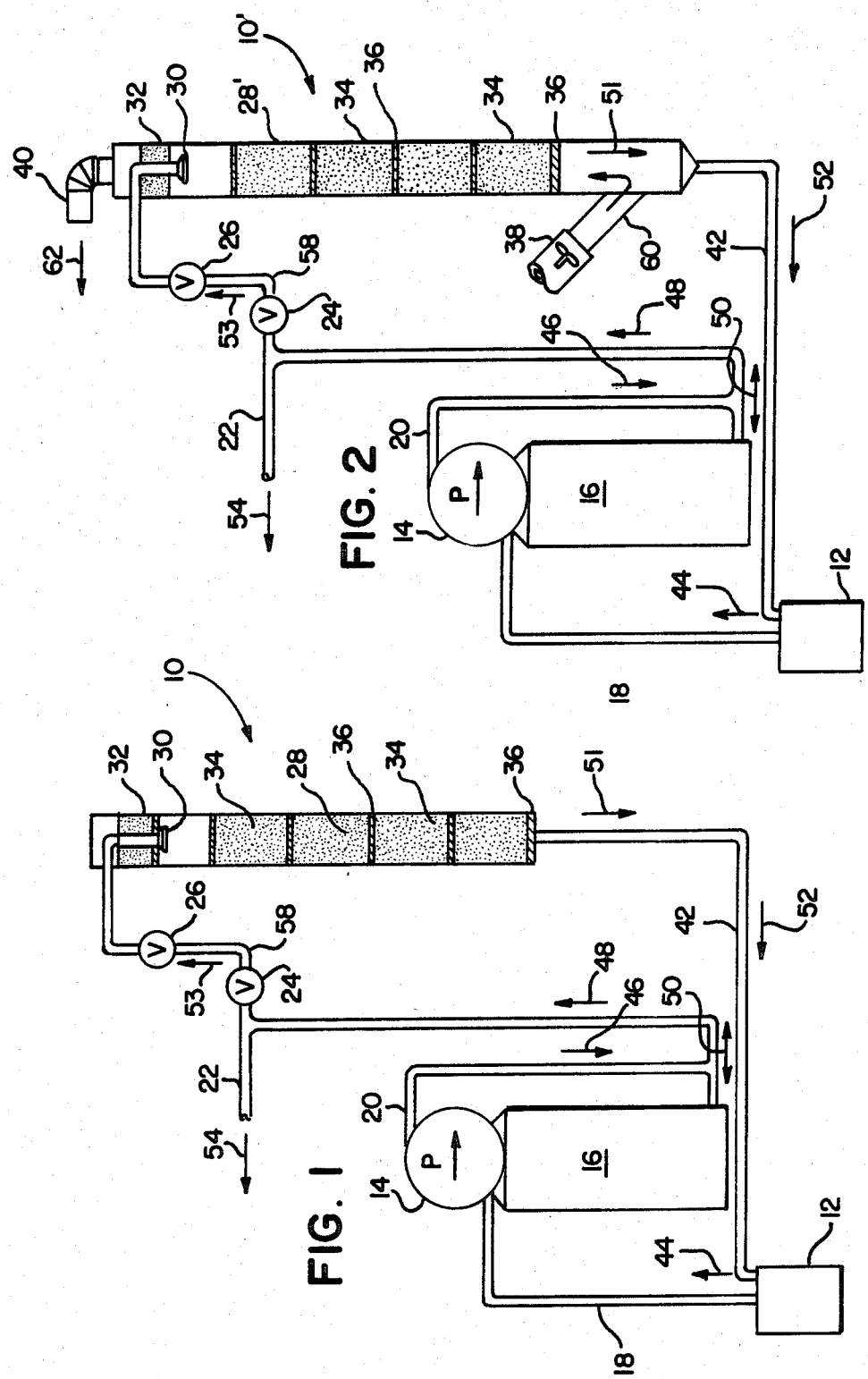

PROCESS FOR PURIFICATION OF CONTAMINATED GROUNDWATER

FIELD OF INVENTION

This invention relates generally to the field of water treating facilities, and more particularly, is directed to a low-cost process capable of significantly reducing water contamination, particularly in a pre-existing point of use system.

BACKGROUND OF THE INVENTION

In rural environments, it is the common practice to provide individual water supplies to homes and other buildings when municipal water service facilities are not economically available. The individual water services usually require the drilling of a well of sufficient depth to reach a suitable underground water supply together with such additional accessory equipment as a pump, a house tank, and necessary piping and controls to provide a complete automatic system.

Prior to the appearance of underground water pollutants and contaminants, these prior art individual water service systems satisfactorily served the required purposes and sufficient quantities of adequate quality water could be pumped from the well for immediate use within the home or other building. However, more recently and in alarmingly increasing occurrence, the groundwater supplies to such wells have become contaminated, thereby rendering the water unsuitable for healthful use upon the premises. Because of such problems, local and federal drinking water guidelines have been established to protect the health of the users. When the contaminants exceed the recommended maximum levels, the regulations usually require that the existing water systems either have to be abandoned in favor of a connection to an existing approved municipal water system or else a new source of water of acceptable quality must be tapped by drilling a new or deeper well.

In either instance, considerable costs must be anticipated, especially when there is no proximate municipal water main available for hookup. If the option of drilling a new or deeper well is chosen, such a procedure is not without risk inasmuch as even after undertaking the expenses involved in the drilling, there is no assurance that the new aquifer, if available, will not also be similarly contaminated. In other approaches to solving the contaminated water supply problem, some prior well users have attempted to prevent contaminants from entering the building water supply system by employing filters of carbon or other suitable filtering material. Such filters have proved to be of only limited use in view of the fact that the carbon or other filter material has only a predetermined capacity to hold contaminants. When the carbon or other filter material capacity to entrain contaminants is exhausted, the filter must be promptly changed to prevent contaminants from passing therethrough directly into the building water supply system. At best, such filter systems are unreliable and present a continuous maintenance problem.

SUMMARY OF THE INVENTION

The process and apparatus for purification of contaminated groundwater in accordance with the present invention has been particularly developed with the thought of providing acceptable performance while at the same time minimizing installation and operating costs. The system of the present invention utilizes the house pump and house tank of an existing private water supply in combination with a newly installed packed column or tower of known design. Because of the continuous flow, the new packed column can be much smaller than might otherwise be required and can be sized to a practical and economical level for installation in a home at minimum cost.

An appropriate packing is supplied within the column to remove the type of contaminant, particularly volatile organic compounds, which are present in the contaminated groundwater. In the preferred embodiment, the system employs aeration in known manner within the packed column to reduce volatile organic chemicals, such as twenty-nine purgeable halocarbons and/or the seven purgeable aromatics as determined by U.S. Environmental Protection Agency Analytical Methods 601 and 602, respectively. For purposes of illustration and not limitation, a list of the purgeable halocarbons and purgeable aromatics identified by the U.S. Environmental Agency is as follows:

METHOD 601-PURGEABLE HALOCARBONS

Chloromethane
Bromomethane
Dichlorodifluoromethane
Vinyl Chloride
Trichlorofluoromethane
1,1-Dichloroethene
1,1-Dichloroethane
trans-2,2-Dichoroethene
Chloroform
1,2-Dichloroethane
1,1,1-Trichloroethane
Carbon tetrachloride
Bromodichloromethane
1,2-Dichloropropene
Trichloroethene (TCE)
Dibromochloromethane
1,1,1-Trichloroethane
cis-1,3-Dichloropropene
2-Chloroethylvinyl ether
Bromoform
1,1,2,2-Tetrachloroethane
Tetrachloroethene (PCE)
Chlorobenzene
1,3-Dichlorobenzene
1,2-Dichlorobenzene
1,4-Dichlorobenzene

METHOD 602-PURGEABLE AROMATICS

Benzene
Chlorobenzene
1,2-Dichlorobenzene
1,3-Dichlorobenzene
1,4-Dichlorobenzene
Ethylbenzene
Toluene The U.S. Environmental Protection Agency is currently proposing to regulate the levels for fourteen of these volatile priority pollutants in public water supplies.

The continuous aeration of the volatile organic contaminants functions to provide an improved supply of water that has reduced levels of contaminants and is of quality sufficient to meet all known water standards for these chemicals.

In practicing the process for groundwater purification in accordance with the present invention, the process is particularly applicable for point of use treatment that employs the inherent overcapacity of an existing point of use system pump in an extremely economical and efficient manner. Water is drawn from the pre-existing point of use storage system and is treated by an appropriate column aeration means to remove or significantly reduce the volatile organic contaminants present. It is an important feature of the invention that the treatment is conducted continuously at a daily rate that exceeds the daily usage rate of the facility. All treated water is continuously returned to the well head where it freely mixes with an improves the untreated water for future use within the system.

It is noteworthy that the use of the existing well and the adjacent aquifer for storage of the purified water serves as a buffer to encroachment by contaminated water and continuously increases the water quality at the well in a manner that requires no additional installation or construction for additional storage capacity. Further, the treatment of the water at a continuous rate and at a rate lower than the peak demand rate for the premises permits the installation of smaller treatment facilities than would otherwise be required for peak rate treatment, thereby additionally providing considerable installation economies. The continuous treatment of the water at a daily rate that exceeds the daily usage rate inherently provides for continuous multiple treatment passes to thereby provide for lower single-pass treatment efficiency requirements.

It is therefore an object of the present invention to provide an improved process and apparatus for purification of contaminated groundwater.

It is another object of the present invention to provide a novel process and apparatus for purification of contaminated groundwater that employs the existing house pump and house tank in combination with a new packed tower aeration system to provide a continuous contaminated water treatment facility.

It is another object of the present invention to provide a novel process and apparatus for purification of contaminated groundwater comprising the steps of providing an aeration tower having suitable packing for removing volatile organic groundwater contaminants, continuously treating water through the packed column at a daily rate exceeding the daily usage rate of the facility, and returning the treated water to the well head for future use.

It is another object of the present invention to provide a novel process and apparatus for purification of contaminated groundwater comprising connecting a packed tower aeration device to the effluent of an existing house pressure system, continuously diverting a quantity of groundwater in excess of the daily usage rate of the facility through the packed tower, removing volatile organic contaminants within the tower and returning the treated water back to the well.

It is another object of the present invention to provide a novel process and apparatus for the purification of contaminated groundwater that is inexpensive in installation, highly efficient in design and trouble free when in use.

Other objects and a fuller understanding of the invention will be had by referring to the following description and claims of a preferred embodiment thereof, taken in conjunction with the accompanying drawings, wherein like reference characters refer to similar parts throughout the several views and in which:

BRIEF DESCRIPTION OF THE DRAWINGS

FIG. 1 is a schematic elevational view showing the apparatus and piping connections in accordance with the present invention.

FIG. 2 is a view similar to FIG. 1 showing a modified packed tower.

DESCRIPTION OF THE PREFERRED EMBODIMENT OF THE INVENTION

Although specific terms are used in the following description for the sake of clarity, these terms are intended to refer only to the particular structure of the invention selected for illustration in the drawings, and are not intended to define or limit the scope of the invention.

Referring now to the drawings, there is schematically indicated in FIG. 1 a groundwater purification system 10 and in FIG. 2, a modified groundwater purification system 10' in accordance with the present invention. As illustrated, an existing pump 14 draws its suction from the existing well 12 in conventional manner through the suction line 18. The pump discharges under pressure through the discharge line 20 to conventionally feed a house tank 16 for pressurized water storage purposes. Water flows through the discharge line 20 in the direction of the arrow 46 to both fill the house tank 16 and to flow toward the house service line 22, as indicated by the double-headed arrow 50 and the arrow 48. The system described thus far, with the pump 14 acting intermittently in response to demand, comprises the general state of the prior art individual domestic water systems.

It is an important feature of this invention, in the case of existing establishments, to utilize as much of the existing domestic water system as possible, including the well 12, the pump 14, the house tank 16, and the pump suction and discharge pipes 18, 20. Of course, if an entirely new facility is being provided, a new well, pump and piping system must also be supplied in order to practice the present invention. A water supply line 58 connects to the water service 22 through an on/off valve 24 to direct water through a packed tower or column aeration unit 28 (FIG. 1) or 28' (FIG. 2).

As shown, the water supply line 58 terminates near the top of the packed tower or column 28, 28' in a conventional distributor or nozzle 30. The packed tower or column is conventional in design and preferably is relatively small in view of a relatively small, continuous flow rate. In the preferred embodiment, the nominal size of the packed column 28, 28' is less than eight feet in height and six inches in diameter.

The packed column 28, 28' is filled with a suitable packing or filter material 34 of the type generally employed for liquid aeration purposes and which may be of hollow, spherical design such as the "TRI-PACKS" column packing as designed and sold by Jaeger Tri-Packs, Inc., Fountain Valley, Calif., or Ballast Saddles as designed and sold by numerous vendors. The packing may be of any suitable, known composition selected from a full range of usual plastic and metal materials commonly available in the market for aeration purposes, depending upon the type of volatile organic compounds to be treated by aeration within the packed column or tower 28, 28' as well known to those skilled in the art. In the usual manner, the packing materials 34 can be supported within the column by employing conventional packing supports 36. If desired, a demister 32 of conventional design can be employed at the top of the packed column, also in known manner.

Upon exiting the nozzle or distributor 30, the water, under gravity flow, flows downwardly through the packing materials 34 and exits the bottom of the packed column 28, 28' through the treated water return line 42 in the direction indicated by the arrows 51, 52. The aerated volatile organic compounds flow in the direction opposite to the water flow and are discharged to atmosphere through the top of the packed column. As illustrated, the treated water return line 42 terminates in a discharge to the existing well 12 to thereby return treated water to the existing well. It is noteworthy that the excess treated water is delivered directly to the well wherein the existing well itself can be used as a storage device for the treated water. Thus, the system returns the entire fractional unused flow back to the well and then the well itself is utilized for storage purposes, without requiring the expense of additional treated water storage capacity.

As hereinabove set forth, the pump 14 is provided with suitable controls (not shown) as necessary for house demand, water under pump pressure, flows through the house service line 22 in the direction of the arrow 54 and a fraction of the flow is directed through the packed column or tower 28, 28' as indicated by the arrow 53 for additional aeration or treatment. All treated water flows back to the well 12 through the return line 42 as indicated by the arrows 51, 52. If desired or necessary, an air vent 44 of conventional design may be provided at the treated water return to the well in usual manner.

Referring now to FIG. 2, in order to enhance the aeration process at or about the packing 34, an air inlet 60 is provided near the bottom of the packed column 28' to introduce a flow of air upwardly through the column to the top vent 40 where it is exhausted as indicated by the arrow 62. The flow of air upwardly through the column or tower 28' is opposite in direction to the water flow as indicated by the arrow 50, all of which aids in the aeration of the volatile organic compounds (not shown) which are present in the contaminated groundwater.

TEST I

A prototype treatment system has been installed on a private well system located in the county of Camden, N.J. The shallow aquifer in this community is utilized by approximately two hundred private residences and has been demonstrated to be extensively contaminated with volatile halogenated organics.

Samples from the initial installation site were collected on Aug. 8, 1983. A prototype design for point of use aeration based upon these sample results was completed by Aug. 14, 1983. Prototype fabrication and installation was completed by Aug. 19, 1983 when the system was first put on line. The aeration system remained on-line through Aug. 26, 1983 at which time the well was resampled. Modifications to yield the system configuration shown in FIG. 1 were designed and implemented by Sept. 11, 1983. The results of sample evaluations for this installation are as follows, the figures giving the noted chemical concentrations in parts per billion:

| Chemical | Aug 8 (untreated) | Aug 26 | Sept 18 | Tower Effluent |
| --- | --- | --- | --- | --- |
| 1,1,1-Trichlorethane | 105 | 18.3 | 8.5 | 2.0 |
| 1,1-Dichloroethylene | 20 | 3 | none detected | none detected |
| Tetrachloroethylene | 1.8 | none detected | none detected | none detected |

The invention also greatly enhances the overall quality of waters lacking oxygen (anaerobic). The air stripping process provides almost complete removal of dissolved carbon dioxide which decreases the acidity of the water and provides a more neutral hydrogen ion concentration (pH). The air stripping process also removes objectionable inorganic chemicals such as iron and sulfides which are commonly found in anaerobic groundwaters.

Although the present invention has been described with reference to the particular embodiments herein set forth, it is understood that the present disclosure has been made only by way of example and that numerous changes in the details of the construction may be resorted to without departing from the spirit and scope of the invention. Thus, the scope of the invention should not be limited by the foregoing specification, but rather, only by the scope of the claims appended hereto.

What is claimed is:

1. A process for obtaining delivery of purified water from a well where the groundwater feeding the well contains contaminants comprising the steps of:

pumping water from the well through the well head and through a flow path which passes through a water treatment unit and returns to the well through the well head;

removing, by means of said water treatment unit, at least a portion of the contaminants from the water in said flow path, as the water flows through said unit;

returning purified water from the water treatment unit to the well through the well head, whereby the well serves as a storage device for the returned water, and the returned water mixes with water in the well and serves as a buffer to encroachment by contaminated groundwater; and delivering a portion of the water in the well to a point of use.

2. The process of claim 1 in which the daily rate of flow of water in said flow path exceeds the daily rate of delivery of water from the well to the point of use.

3. The process of claim 1 in which the step of pumping water through said flow path is carried out continuously over a period of time while the step of delivering a portion of the water in the well to a point of use is carried out intermittently during the same period of time.

4. The process of claim 3 in which the daily rate of flow of water in said flow path exceeds the daily rate of delivery of water from the well to the point of use.

5. The process of claim 4 in which the instantaneous rate of flow of water to the point of use in said delivering step exceeds the rate of flow of water in said flow path.

6. The process of claim 1 in which the step of delivering a portion of the water in the well to a point of use is carried out by diverting a portion of the water in said flow path to a point of use, and in which the step of pumping water through said flow path and the step of delivering a portion of water in the well to a point of use are carried out by the same pump.

7. The process of claim 6 in which the daily rate of flow of water in said flow path exceeds the daily rate of delivery of water from the well to the point of use.

8. The process of claim 7 in which the instantaneous rate of flow of water to the point of use in said delivering step exceeds the rate of flow of water in said flow path.

9. The process of claim 1 in which the contaminants contained in the groundwater are volatile contaminants, in which the water treatment unit is an aerator and in which the step of removing at least a portion of the contaminants is carried out by aeration in said aerator.

10. A method of modifying a domestic water supply system comprising a well, a suction line, connected to the well and extending through the well head, for the withdrawal of water from the well, and pumping means arranged to cause flow of water from the well through the suction line and to discharge water to a point of use, comprising the steps of: connecting the water inlet of a water treatment unit, having a water inlet and a water outlet, to the pump discharge by forming a branch connection allowing water to flow from the pump discharge to the point of use when a demand exists at the point of use and at the same time allowing water to flow from the pump discharge to the water treatment unit; and connecting the water outlet of said unit through a line arranged to return water from said unit to the well through the well head.

11. The method of claim 10 in which the water treatment unit is an aerator.

* * * * *